United States Patent
Yoshida

(10) Patent No.: US 8,993,163 B2
(45) Date of Patent: Mar. 31, 2015

(54) POSITIVE ELECTRODE ACTIVE MATERIAL AND METHOD FOR PRODUCING SAME

(75) Inventor: Jun Yoshida, Susono (JP)

(73) Assignee: Toyota Jidosha Kabushiki Kaisha, Toyota-shi, Aichi (JP)

(*) Notice: Subject to any disclaimer, the term of this patent is extended or adjusted under 35 U.S.C. 154(b) by 16 days.

(21) Appl. No.: 13/386,763

(22) PCT Filed: Jul. 31, 2009

(86) PCT No.: PCT/JP2009/063661
§ 371 (c)(1),
(2), (4) Date: Jan. 24, 2012

(87) PCT Pub. No.: WO2011/013243
PCT Pub. Date: Feb. 3, 2011

(65) Prior Publication Data
US 2012/0121985 A1    May 17, 2012

(51) Int. Cl.
*H01M 4/133* (2010.01)
*H01M 4/58* (2010.01)
(52) U.S. Cl.
CPC .................................. *H01M 4/5825* (2013.01)
USPC ................... 429/218.1; 429/223; 429/231.95; 429/231.9; 429/231.6
(58) Field of Classification Search
USPC ............ 429/223, 218.1, 231.95, 231.9, 231.6
See application file for complete search history.

(56) References Cited

U.S. PATENT DOCUMENTS

| | | | |
|---|---|---|---|
| 7,041,239 B2 | 5/2006 | Barker et al. | |
| 2003/0054253 A1* | 3/2003 | Morishima et al. | 429/231.95 |
| 2004/0096743 A1 | 5/2004 | Okae et al. | |
| 2006/0147365 A1 | 7/2006 | Okada et al. | |
| 2009/0130559 A1 | 5/2009 | Okada et al. | |
| 2009/0286139 A1 | 11/2009 | Awano | |
| 2010/0148114 A1 | 6/2010 | Iizuka et al. | |

FOREIGN PATENT DOCUMENTS

| | | |
|---|---|---|
| CA | 2 358 281 | 4/2002 |
| CN | 101485034 | 7/2009 |
| JP | 2003-203628 | 7/2003 |
| JP | 2004-87299 | 3/2004 |

(Continued)

OTHER PUBLICATIONS

Wolfenstine et al. "LiNiPO4—LiCoPO4 solid solutions of cathodes" Journal of Power Sources 136 published in 2004 pp. 150-153.*

(Continued)

*Primary Examiner* — Stewart Fraser
*Assistant Examiner* — Olatunji Godo
(74) *Attorney, Agent, or Firm* — Finnegan, Henderson, Farabow, Garrett & Dunner, LLP

(57) ABSTRACT

A positive electrode active material provided by the present invention is formed of a lithium-nickel-containing metal phosphate compound represented by a general formula: $LiNi_{(1-x)}M_xPO_4$ (1) (in Formula (1), M is one or more metal elements selected from divalent and trivalent metal elements, and x is a number satisfying the condition $0<x<0.5$). At least part of a surface of the lithium-nickel-containing metal phosphate compound is covered with carbon, and the lithium-nickel-containing metal phosphate compound covered with carbon has an olivine-type crystal structure confirmed by structure analysis by X-ray diffraction.

2 Claims, 7 Drawing Sheets

(56) References Cited

FOREIGN PATENT DOCUMENTS

| | | |
|---|---|---|
| JP | 2006-523368 | 10/2006 |
| JP | 2007-250417 | 9/2007 |
| JP | 2009-62256 | 3/2009 |
| KR | KR-10-2005-0089793 | 9/2005 |
| WO | WO 2007/034821 A1 | 3/2007 |
| WO | WO 2007/034823 A1 | 3/2007 |

OTHER PUBLICATIONS

Shanmukaraj et al. "Synthesis and Characterization of LiNiyCo1—yPO4 (y=0-1) Cathode Batteries for Lithium Secondary Batteries" Ionics 10 published in 2004 pp. 88-92.*

Yang et al. (Journal of the Electrochemical Society, 153 (4) A716-A723 (2006)).*

Translation of the International Preliminary Report on Patentability for PCT/JP2009/063661 dated Mar. 15, 2012.

O. Garcia-Moreno et al., Influence of the Structure on the Electrochemical Performance of Lithium Transition Metal Phosphates as Cathodic Materials in Rechargeable Lithium Batteries: A New High-Pressure Form of $LiMPO_4$ (M=Fe and Ni), Chem. Mater., vol. 13, No. 5, pp. 1570-1576 (2001).

International Search Report in International Application No. PCT/JP2009/063661; Mailing Date: Nov. 2, 2009.

Wolfenstine, J. et al., "$Ni^{3+}/Ni^{2+}$ redox potential in $LiNiPO_4$," Journal of Power Sources 142, (2005), pp. 389-390.

* cited by examiner

POSITIVE ELECTRODE ACTIVE MATERIAL AND METHOD FOR PRODUCING SAME

CROSS-REFERENCE TO RELATED APPLICATIONS

This application is a national phase application of International Application No. PCT/JP2009/063661, filed Jul. 31, 2009, the contents of which are incorporated herein by reference.

TECHNICAL FIELD

The present invention relates to a positive electrode active material that can be advantageously used in a lithium battery such as a lithium ion secondary battery, and to a method for manufacturing the active material. More specifically, the present invention relates to a positive electrode active material formed of a lithium-containing metal phosphate compound having an olivine-type crystal structure.

BACKGROUND ART

Since lithium batteries (typically, lithium ion secondary batteries) that are charged and discharged by the movement of lithium ions between a positive electrode and a negative electrode have a small weight and a high output, the demand for such batteries as power supplies to be carried on vehicles and installed in personal computers and portable terminals is expected to grow significantly in the future.

A typical configuration of a secondary battery of this kind includes an electrode with a configuration in which a material (electrode active material) that can reversibly store and release lithium ions, which are charge carriers, is supported on a conductive material (electrode collector), and the above-mentioned electrode active materials have been studied to realize a further increase in energy density and output. For example, materials having a crystal structure of a layered rock salt type, such as of a NiCo system and a NiCoMn system, or materials having a spinel-type crystal structure such as $LiMn_2O_4$ are generally known as positive electrode active materials for lithium secondary batteries that are used for the positive electrode. In addition, lithium-containing metal phosphates with an olivine-type crystal structure (referred to hereinbelow simply as "olivine-type phosphates") represented by the general formula $LiMPO_4$ (M is an element of at least one kind from among Co, Ni, Mn, and Fe) have also been suggested as positive electrode active materials with a high theoretical capacity, low cost, and excellent stability.

The above-mentioned olivine-type phosphates are generally synthesized by a solid-phase synthesis method by which powdered compounds serving as starting materials are weighed to obtain a predetermined composition, mixed, and heat treated (calcined), and a liquid-phase method by which the starting materials are mixed homogeneously in a liquid phase and then calcined. An attempt has been made to increase electric conductivity of the olivine-type phosphates as positive electrode active materials by adding a conductive material (for example, a carbon powder) to the positive electrode active material in the synthesis process or thereafter. For example, Patent Document 1 discloses a method for manufacturing an olivine-type phosphate compound in which conductive paths made of carbon are incorporated into the particles by mixing a starting material mixture of the positive electrode material and an organic material and then calcining. Further, Patent Document 2 discloses a method for manufacturing a positive electrode material for a lithium ion battery in which olivine-type phosphate compounds are bonded together by carbon generated by thermal decomposition of reduced sugar.

Patent Document 1: Japanese Patent Application Laid-open No. 2003-203628

Patent Document 2: Japanese Patent Application Laid-open No. 2007-250417

DISCLOSURE OF THE INVENTION

Problem to be Solved by the Invention

Nickel-containing olivine-type phosphate compounds (typically, represented by $LiNiPO_4$; referred to hereinbelow as "lithium-nickel-containing metal phosphate compounds") have attracted attention as compounds that can be expected to have an energy density higher than other olivine-type phosphates (for example, $LiFePO_4$) because they have a high potential equal to or higher than 5 V. However, since the electron conductivity thereof is also lower than that of other olivine-type phosphate compounds, it is desirable that the particle surface be covered (be provided with), for example, a carbon material as a conductive material for obtaining the desired battery characteristics (for example, a high-rate characteristic or a cyclic characteristic). However, with a lithium-nickel-containing metal phosphate compound covered on the surface with carbon, the crystal structure easily collapses in the calcination process, thereby making it difficult to obtain a lithium-nickel-containing metal phosphate compound with high crystallinity (that is, having an olivine-type crystal structure). Substantial degradation of crystallinity resulting from the application of carbon is a problem inherent to lithium-nickel-containing metal phosphate compound. Therefore, it can be said that the task is to synthesize a lithium-nickel-containing metal phosphate compound that is covered with carbon (has increased conductivity), without destroying the crystal structure.

The present invention has been created to resolve this problem and it is an object of the present invention to provide a lithium-nickel-containing metal phosphate compound with an olivine-type crystal structure and carbon applied thereto that has high crystallinity and also to provide a method for manufacturing such a compound. Another object is to provide a positive electrode active material formed of the olivine-type lithium-nickel-containing metal phosphate compound having high crystallinity and a method for manufacturing such an active material. Yet another object is to provide a lithium secondary battery in which a positive electrode contains a positive electrode active material formed of such a lithium-nickel-containing metal phosphate compound.

Means for Solving the Problem

In order to attain the above-mentioned objects, the present invention provides a positive electrode active material formed of a lithium-nickel-containing metal phosphate compound represented by a general formula:

$$LiNi_{(1-x)}M_xPO_4 \qquad (1)$$

(in Formula (1), M is one or more metal elements selected from divalent and trivalent metal elements, and x is a number satisfying the condition 0<x<0.5). In this positive electrode active material, at least part of a surface of the lithium-nickel-containing metal phosphate compound is covered with carbon, and the lithium-nickel-containing metal phosphate compound covered with carbon has an olivine-type crystal structure confirmed by structure analysis by X-ray diffraction.

The "lithium secondary battery" as referred to in the present description is a secondary battery using lithium ions as electrolyte ions, in which charge and discharge are realized by the movement of electric charges carried by lithium ions between the positive and negative electrodes. A secondary battery that is generally called a lithium ion battery is a typical example of the lithium secondary battery disclosed in the present description.

The "positive electrode active material" as referred to in the present description is an active material on the positive electrode side that can reversibly store and release (typically, absorb and desorb) chemical species (for example, lithium ions) that are charge carriers in a secondary battery.

The positive electrode active material formed of the lithium-nickel-containing metal phosphate compound in accordance with the present invention is represented by general formula (1): $LiNi_{(1-x)}M_xPO_4$, and at least part of the surface of this compound is covered with carbon. One or more metal elements selected from divalent and trivalent metal elements are included as the M element in the above-mentioned Formula (1) at a ratio less than the content ratio of Ni (that is, x representing the molar composition ratio of the M element is a number satisfying the condition of $0<x<0.5$).

In the process for manufacturing a lithium-nickel-containing metal phosphate compound covered on the surface with carbon (typically, mainly by calcining), the crystal structure easily collapses, and the phosphate compound with high crystallinity (that is, having an olivine-type crystal structure) has heretofore been difficult to obtain. The inventors have discovered that a positive electrode active material formed of a lithium-nickel-containing metal phosphate compound including one or more metal elements selected from divalent and trivalent metal elements (M element) and covered on the surface with carbon is provided with an olivine-type crystal structure as determined by structure analysis based on X-ray diffraction. Thus, the lithium-nickel-containing metal phosphate compound disclosed herein that is covered on at least part of the surface with carbon and includes the M element typically has the strongest peak belonging to the lithium-nickel-containing metal phosphate compound of the olivine-type crystal structure at a position close to a 2θ value of about 27° or 37° (for example, 27°±1°, 37°±1°) in the X-ray diffraction pattern measured by a powder X-ray diffraction analyzer (XRD). Therefore, the lithium-nickel-containing metal phosphate compound including one or more metal elements selected from divalent and trivalent metal elements as the M element in the above-mentioned formula (1) can be used as a positive electrode active material having the olivine-type crystal structure and high crystallinity even though part of the surface thereof is covered with carbon. Thus, according to the present invention, it is possible to provide a positive electrode active material having excellent conductivity and a high energy density.

In a preferred embodiment of the positive electrode active material disclosed herein, the above-mentioned M element is at least one selected from the group consisting of Mg, Mn, and Al. It is even more preferred that the M element be Mg and/or Mn.

Mg, Mn, and Al are preferred, from among the divalent and trivalent metals, as the M element in the lithium-nickel-containing metal phosphate compound represented by Formula (1): $LiNi_{(1-x)}M_xPO_4$, and it is especially preferred that Mg and/or Mn be included. The lithium-nickel-containing metal phosphate compound including such metal elements and covered with carbon over the entire surface or part thereof can be confirmed to have an olivine-type crystal structure with high crystallinity by structure analysis based on X-ray diffraction. Thus, the positive electrode active material formed of such phosphate compound excels in electric conductivity and has a high energy density. Thus, by using the lithium-nickel-containing metal phosphate compound disclosed herein, it is possible to construct a lithium secondary battery having excellent battery characteristics (for example, high-rate characteristic and cyclic characteristic).

In the preferred embodiment of the positive electrode active material disclosed herein, x in the above-mentioned Formula (1) is a number satisfying the condition $0<x\leq0.2$.

Where the content ratio x of the M element satisfies the condition $0<x\pm0.2$, it is possible to provide a positive electrode active material of excellent utility that combines a high energy density with ability to maintain the olivine-type crystal structure.

As another aspect for attaining the above-mentioned objects, the present invention also provides a method for manufacturing a positive electrode active material formed of the lithium-nickel-containing metal phosphate compound. The manufacturing method disclosed herein is a method for manufacturing a positive electrode active material formed of a lithium-nickel-containing metal phosphate compound represented by a general formula: $LiNi_{(1-x)}M_xPO_4$ (1) (in Formula (1), M is one or more metal elements selected from divalent and trivalent metal elements, and x is a number satisfying the condition $0<x<0.5$), the method including the steps of:

(1) preparing a starting material mixture including a lithium source substance, a nickel source substance, a phosphoric acid source substance and at least one M element source substance; (2) pre-calcining the starting material mixture in a temperature range equal to or lower than 500° C.; (3) adding a carbon material or an organic compound material to a pre-calcined matter obtained in the pre-calcining step, and applying the material to at least part of a surface of the pre-calcined matter; and (4) calcining the pre-calcined matter having the material applied thereto at a temperature higher than the pre-calcination temperature, to cover at least part of a surface of the calcined matter with carbon.

A method for adding a conductive powder (carbon powder or the like) to a starting material mixture and calcining the two together is generally used as means for imparting electric conductivity to a lithium-containing metal phosphate compound with a low electric conductivity. However, in the lithium-containing metal phosphate compound having carbon applied thereto (covered thereon), chemical composition ratio changes in the calcination process and the crystal structure easily collapses. The degradation of crystallinity caused by the addition of carbon is especially significant in a lithium-nickel-containing metal phosphate compound including nickel. Therefore, it has been difficult to obtain a lithium-nickel-containing metal phosphate compound that is covered with carbon and has high crystallinity (that is, has an olivine-type crystal structure).

With the manufacturing method in accordance with the present invention having the above-mentioned configuration, a lithium-nickel-containing metal phosphate compound is manufactured in which one or more metal elements selected from divalent and trivalent metal elements are included as the M element in $LiNi_{(1-x)}M_xPO_4$ in Formula (1) at a ratio less than the content ratio of Ni (that is, x representing the composition ratio of the M element is a number satisfying the condition $0<x<0.5$). Further, with the above-described process, it is possible to synthesize a lithium-nickel-containing metal phosphate compound that has high crystallinity even though the surface thereof is covered with carbon. As a result, it is possible to manufacture a positive electrode active material formed of a lithium-nickel-containing metal phosphate compound that excels in electric conductivity and has a high energy density. Therefore, with the manufacturing method in accordance with the present invention, it is possible to provide a lithium secondary battery (and a positive electrode thereof) having excellent battery characteristics (battery capacity, cyclic characteristic, and high-rate characteristic).

In a preferred embodiment of the method disclosed herein, the aforementioned M element is at least one selected from the group consisting of Mg, Mn, and Al. An even more preferred M element is Mg and/or Mn.

By adding such M element to the starting material, it is possible to manufacture more advantageously a calcined matter in which the olivine-type crystal structure is maintained, without changes in the chemical composition ratio in calcination performed after the above-mentioned carbon material or organic compound material has been applied.

In the preferred embodiment of the method disclosed herein, the above-mentioned starting material mixture is prepared such that x in the above-mentioned formula (1) satisfies the condition $0<x\leq0.2$.

Where the starting material mixture is adjusted so that the composition ratio of the M element is within the aforementioned range, it is possible to manufacture a positive electrode active material formed of a lithium-nickel-containing metal phosphate compound that excels in utility, has a high energy density and also maintains the olivine-type crystal structure.

The amount added of the aforementioned carbon material or organic compound material is set to an amount of 10 parts by weight to 40 parts by weight with respect to 100 parts by weight of the starting material mixture.

The carbon material or organic compound material (referred to hereinbelow together as "material for carbon coating") added to the pre-calcined matter after the pre-calcination step is covered on the crystal surface of the lithium-nickel-containing metal phosphate compound under the effect of high temperature during calcination (the organic compound material is carbonized by the large amount of heat), and a conductive carbon film can be formed. Where the material for carbon coating is added at the above-mentioned ratio, it is possible to cover uniformly the surface of the lithium-nickel-containing metal phosphate compound with carbon with higher efficiency.

In yet another preferred embodiment, the calcination is implemented in a temperature range above 500° C. and equal to or lower than 900° C.

Where heating is performed in a temperature range above 500° C. and equal to or lower than 900° C. (preferably 600° C. to 800° C.) in the main calcination step, the density of the olivine-type crystal structure of the lithium-nickel-containing metal phosphate can be advantageously increased. As a result, it is possible to obtain excellent battery characteristics (for example, high-rate characteristic and cyclic characteristic) in a lithium secondary battery constructed by using the lithium-nickel-containing metal phosphate with high crystallinity as the positive electrode active material.

Another aspect of the present invention resides in a lithium secondary battery. Thus, a lithium secondary battery is provided that includes, as a positive electrode, the positive electrode active material (including a positive electrode active material manufactured by any manufacturing method) formed of the lithium-nickel-containing metal phosphate disclosed herein. The lithium secondary battery including such a positive electrode can be a battery in which the decrease in energy density is inhibited even when the battery is used in a cyclic mode under a high output.

The present invention also provides a vehicle provided with the lithium secondary battery disclosed herein. The lithium secondary battery provided by the present invention can demonstrate the performance (for example, high-rate characteristic and cyclic characteristic) suitable for a battery power supply installed on a vehicle. Therefore, the lithium secondary battery disclosed herein can be advantageously used as a power supply for a motor (electric motor) installed on a vehicle such as an automobile provided with an electric motor, such as a hybrid automobile and an electric automobile.

DESCRIPTION OF EMBODIMENTS

Figure 1:
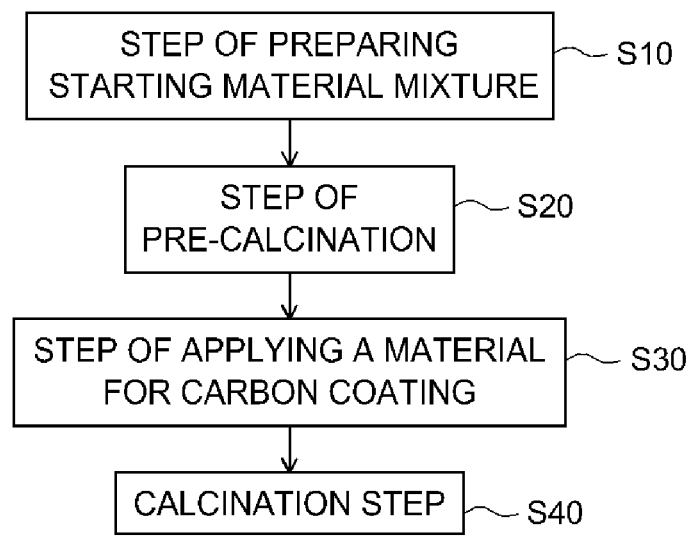
FIG. 1 is a process flow chart illustrating the process for manufacturing the lithium-nickel-containing metal phosphate according to an embodiment.

The preferred embodiments of the present invention will be described below. The features that are necessary for carrying out the invention, but are other than those specifically set forth in the present description, can be construed to be design matters for a person skilled in the art that are based on the prior art in the pertinent technical field. The present invention can be carried out on the basis of the contents disclosed in the present description and general technical knowledge in the pertinent technical field.

A positive electrode and a method for manufacturing the positive electrode will be explained below in greater detail with respect to a lithium secondary battery provided with a positive electrode including a positive electrode active material represented by a general formula (1): $LiNi_{(1-x)}M_xPO_4$ (in Formula (1), M is one or more metal elements selected from divalent and trivalent metal elements, and x is a number satisfying the condition $0<x<0.5$) as a preferred embodiment of the positive electrode active material formed of the lithium-nickel-containing metal phosphate compound disclosed herein, but the present invention is not intended to be limited to this embodiment.

Further, the features that are necessary for carrying out the invention (for example, the configuration and manufacturing method of the electrode assembly provided with the positive electrode and negative electrode, configuration and manufacturing method of separator and electrolyte, and general features relating to the structure of a lithium secondary battery), but are other than those specifically set forth in the present description, can be construed to be design matters for a person skilled in the art that are based on the prior art in the pertinent technical field.

In the drawings below, members and parts demonstrating like action are assigned with like reference symbols and redundant explanation thereof can be omitted or simplified. The dimensional relationships in the drawings (length, width, thickness, etc.) do not reflect actual dimensional relationships.

First, the positive electrode active material formed of the lithium-nickel-containing metal phosphate compound of the present embodiment will be explained.

The positive electrode active material disclosed herein is formed of a lithium-nickel-containing metal phosphate compound represented by general formula:

$$\text{LiNi}_{(1-x)}\text{M}_x\text{PO}_4 \quad (1)$$

(in Formula (1), M is one or more metal elements selected from divalent and trivalent metal elements, and x is a number satisfying the condition 0<x<0.5). At least part of the surface of the lithium-nickel-containing metal phosphate compound is covered with carbon.

Since the lithium-nickel-containing metal phosphate compound has a low electric conductivity, it is preferably used as the positive electrode active material after the surface thereof is covered with carbon (electric conductivity is imparted thereto). However, in the lithium-nickel-containing metal phosphate compound covered with carbon, the chemical composition ratio changes in the manufacturing process (typically, during calcination), the crystal structure easily collapses, and the phosphate compound with high crystallinity has heretofore been difficult to obtain. The positive electrode active material formed of the lithium-nickel-containing metal phosphate compound disclosed herein is represented by the above-mentioned Formula (1), and one or more metal elements selected from divalent metals and trivalent metals are included as the M element at a ratio less than the content ratio of Ni (that is, x representing the composition ratio of the M element is a number satisfying the condition 0<x<0.5). In such a lithium-nickel-containing metal phosphate compound, the crystal structure is not destroyed, even if at least part of the surface is covered with carbon, and the compound can be confirmed to have an olivine-type crystal structure by structural analysis based on X-ray diffraction. Thus, where the crystal structure of the lithium-nickel-containing metal phosphate compound that is covered with carbon and includes the M element is confirmed by an X-ray diffraction pattern measured by a powder X-ray diffraction analyzer (XRD), a strong peak belonging to the lithium-nickel-containing metal phosphate compound of the olivine-type crystal structure can be observed at a position close to a 2θ value of about 27° or 37° (for example, 27°±1°, 37°±1°).

Further, the M element in the lithium-nickel-containing metal phosphate compound represented by Formula (1): $\text{LiNi}_{(1-x)}\text{M}_x\text{PO}_4$ is one or more metal elements selected form divalent and trivalent metals. For example, this element is at least one selected from the group consisting of Mg, Mn, and Al. The even more preferred M element is Mg and/or Mn. The lithium-nickel-containing metal phosphate compound that includes such a metal element and is covered with carbon can be confirmed by structure analysis based on X-ray diffraction to have the olivine-type crystal structure with higher crystallinity. Therefore, a positive electrode active material having a high energy density can be obtained.

Further, in the chemical composition ratio of the lithium-nickel-containing metal phosphate compound represented by Formula (1): $\text{LiNi}_{(1-x)}\text{M}_x\text{PO}_4$, the composition ratio x of the M element is preferably a number satisfying the condition 0<x≤0.2. As the number of x in the above-mentioned Formula (1) increases, the composition ratio of the M element increases and the composition ratio of Ni decreases, and therefore the energy density of the positive electrode active material decreases. Therefore, it can be said that the M element should be contained in as small an amount as possible. Accordingly, by setting x in the above-mentioned Formula (1) to 0<x≤0.2 in the lithium-nickel-containing metal phosphate compound disclosed herein, it is possible to provide a positive electrode active material in which the olivine-type crystal structure is maintained, while decrease in energy density is being inhibited.

A method for manufacturing the positive electrode active material formed of the lithium-nickel-containing metal phosphate compound will be described below.

With the manufacturing method disclosed herein, a positive electrode active material is manufactured that is formed of a lithium-nickel-containing metal phosphate compound represented by a general formula: $\text{LiNi}_{(1-x)}\text{M}_x\text{PO}_4$ (1) (in Formula (1), M is one or more metal elements selected from divalent and trivalent metal elements, and x is a number satisfying the condition 0<x<0.5). As shown in FIG. 1, this manufacturing method generally includes a step (S10) of mixing starting materials to prepare a starting material mixture, a step (S20) of pre-calcining the starting material, a step (S30) of adding a material for carbon coating to the pre-calcined matter and applying the material to at least part of the surface of the pre-calcined matter, and a step (S40) of calcining the pre-calcined matter having the material applied thereto at a temperature higher than the pre-calcination and covering at least part of the surface of the calcined matter with carbon. These steps will be described below in greater detail.

<Starting Materials>

First, the starting materials for constituting the lithium-nickel-containing metal phosphate compound represented by the above-mentioned Formula (1) are prepared. Thus, a lithium source substance, a nickel source substance, a phosphoric acid source substance and at least one M element source substance are prepared as the starting materials. One compound may be used as a supply source for each element, or a mixture of two or more compounds may be used therefore, A starting material compound (for example, nickel phosphate hydrate or lithium phosphate) functioning as a supply source for two or more elements can be also used.

A compound including a lithium source substance, which is one of the above-mentioned starting materials, is not particularly limited, provided that this compound can be dissolved or uniformly dispersed in an aqueous solvent, and various lithium compounds can be used. For example, organic lithium oxide compounds such as lithium acetate and lithium oxalate and inorganic lithium oxide compounds such as lithium carbonate, lithium hydroxide, and lithium phosphate may be used. Lithium acetate dihydrate [Li(CH$_3$COO) .2H$_2$O] that can be easily dissolved in aqueous solvents is an especially preferred example.

A compound including the above-mentioned nickel source substance is not particularly limited, provided that the compound can be dissolved or uniformly dispersed in aqueous solvents, and various organic acid salts can be used. For example, compounds of nickel and organic acids such as nickel acetate and nickel oxalate can be used. Nickel (II)

acetate tetrahydrate [Ni(CH$_3$COO)$_2$.4H$_2$O] that can be easily dissolved in aqueous solvents is an especially preferred example.

A compound including the above-mentioned phosphoric acid source substance is not particularly limited, provided that the compound can be dissolved or uniformly dispersed in aqueous solvents, and various phosphoric acid compounds can be used. For example, ammonium hydrogen phosphates such as ammonium dihydrogen phosphate [NH$_4$H$_2$PO$_4$] and diammonium hydrogen phosphate can be used. Alternatively, phosphoric acid or a solution including phosphoric acid may be also used as a phosphoric acid source.

One or more metal elements selected from divalent and trivalent metals can be used as the above-mentioned M element source substance. Mg, Mn, and Al are preferred, and Mg and Mn are especially preferred as the M element. Where the M element source substance is added to the starting material, the chemical composition ratio does not change in the below-described calcining step and a lithium-nickel-containing metal phosphate compound covered with carbon can be synthesized.

For example, compounds of manganese and organic acids such as manganese acetate and manganese oxalate can be used as the compounds including a manganese source substance in the case where the M element is Mn. Manganese (II) acetate tetrahydrate [Mn(CH$_3$COO)$_2$.4H$_2$O] that can be easily dissolved in aqueous solvents is an especially preferred example.

<Preparation of Starting Material Mixture>

The above-mentioned prepared starting materials are weighed and mixed with an aqueous solvent to prepare a starting material mixture. In this case, the mixing weight ratio of the starting materials is adjusted (weighed) so that the molar composition ratio x of the M element in the above-mentioned Formula (1) satisfies the conditions of 0<x<0.5. It is even more prepared that the mixing weight ratio of the starting materials be adjusted so that the condition of 0<x≤0.2 is satisfied. Where the composition ratio of the M element in the chemical composition ratio of the lithium-nickel-containing metal phosphate compound represented by Formula (1) LiNi$_{(1-x)}$M$_x$PO$_4$ increases (the value of x increases), the composition ratio of Ni in the lithium-nickel-containing metal phosphate compound decreases, and therefore the energy density of the positive electrode active material decreases. Therefore, where the M element source substance is prepared such that x satisfies the condition of 0<x≤0.2 and the mixing weight ratio of the starting materials is adjusted, it is possible to manufacture a positive electrode active material formed of the lithium-nickel-containing metal phosphate compound in which the olivine-type crystal structure is maintained, while the decrease in energy density caused by the inclusion of the M element is being suppressed.

Figure 2:
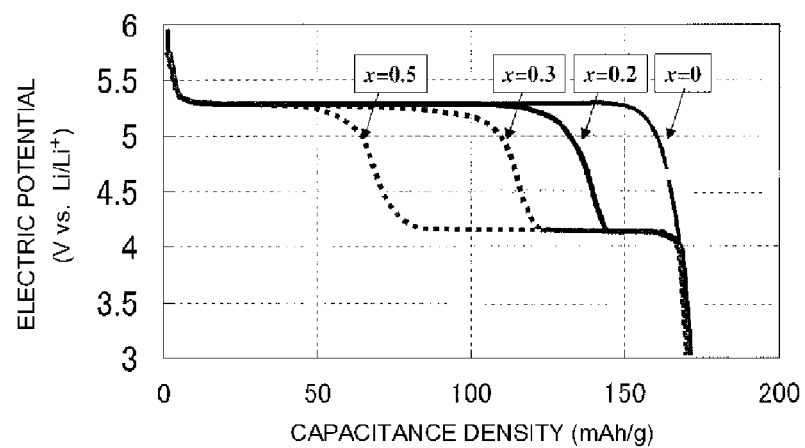
FIG. 2 illustrates schematically a charge-discharge curve of a lithium secondary battery constructed by using the positive electrode active material formed of the lithium-nickel-containing metal phosphate.

FIG. 2 shows schematically the charge-discharge curves of lithium secondary batteries constructed by using as positive electrode active materials phosphate compounds with a composition ratio x of the M element (for example, Mn) being x=0 (LiNiPO$_4$), x=0.2 (LiNi$_{0.8}$Mn$_{0.2}$PO$_4$), x=0.3 (LiNi$_{0.7}$Mn$_{0.3}$PO$_4$), and x=0.5 (LiNi$_{0.5}$Mn$_{0.5}$PO$_4$), from among the lithium-nickel-containing metal phosphate compound represented by Formula (1) LiNi$_{(1-x)}$M$_x$PO$_4$.

As shown in FIG. 2, where the value of x is small, the composition ratio of the M element increases and energy loss that accompanies the decrease in capacitance density increases. Therefore, x may be typically set to 0<x<0.5, preferably 0<x≤0.3, and more preferably 0<x≤0.2.

After the mixing weight ratio of the starting materials has been adjusted, an aqueous solvent is added, the components are mixed and then sufficient diffusion or permeation is induced to prepare a (gelled) starting material mixture. Stirring (including kneading and pulverization) may be performed, as necessary, during mixing. An apparatus used for mixing is not particularly limited, and for example, a planetary mixer, a planetary stirring device, a disperser, a ball mill, a kneader, or a mixer can be used to ensure uniform diffusion or permeation of the above-mentioned starting material mixture and form a stable mixed state.

A gelling method used to prepare a gelled starting material mixture is not particularly limited and a gelling agent may be added to enhance the gelling process. Glycolic acid (C$_2$H$_4$O$_3$) can be advantageously used as the gelling agent. The amount of gelling agent added is not particularly limited and may be adjusted as appropriate to obtain the desired gelled state. Further, by heating the mixed starting materials to a temperature range from room temperature to 100° C. (typically 50° C. to 90° C., preferably 60° C. to 80° C., and even more preferably 70° C. to 80° C.), it is possible to evaporate part of the aqueous solvent and change the particle dispersion state from a sol state to a gel state that lacks flowability. The gelled starting material mixture that is thus prepared is in a state lacking flowability, while retaining the aqueous solvent.

The aqueous solvent for mixing the starting materials is typically water, but may also be a composition that demonstrates as a whole aqueous properties. For example, an aqueous solution including a lower alcohol (methanol, ethanol, and the like) is preferred. Thus, water or a mixed solvent including water as the main component can be advantageously used. One or more organic solvents (lower alcohols, lower ketones, etc.) that can mix uniformly with water can be selected as appropriate as a solvent other than water that constitutes the mixed solvent. For example, it is preferred that a solvent in which water constitutes about 80 wt. % or more (more preferably, about 90 wt. % or more, even more preferably about 95 wt. % or more) of the aqueous solvent be used. In a particularly preferred example, a solvent constituted substantially by water is used.

<Pre-Calcination>

The pre-calcination will be explained below. The starting material mixture prepared by mixing with the aqueous solvent is pre-calcined in a temperature range equal to or lower than 500° C. The heating temperature during pre-calcination is typically 200° C. to 500° C., preferably 200° C. to 450° C., more preferably 250° C. to 400° C., and still more preferably 300° C. to 350° C. By heating and pre-calcining in such a temperature range, it is possible to diffuse uniformly the gelled starting material mixture, while inhibiting rapid growth of crystals. Where the components of the starting material mixture are uniformly diffused, mixing can be performed to a ratio close to a stoichiometric composition. In the below-described calcination performed at a higher temperature, the crystals of fine grains of a lithium-nickel-containing metal phosphate compound of the stoichiometric composition or a composition close thereto grow with good stability. As a result a positive electrode active material with high crystallinity can be obtained.

<Application of Material for Carbon Coating (Organic Compound Material or the Like)>

The application of material for carbon coating will be explained below. The appropriate material for carbon coating is added to the pre-calcined matter obtained in the above-described pre-calcination step.

Since lithium-nickel-containing metal phosphate compounds of olivine-type crystal structure have a high theoretical capacity, but low conductivity, such compositions should be imparted with electric conductivity in order to obtain the desired battery characteristics. Accordingly, a powdered material for carbon coating is added to the obtained pre-calcined matter after pre-calcination and the components are mixed (stirred) by using a mixing device or the like to apply the material for carbon coating to at least part of the surface of the pre-calcined matter. As a result, it is possible to impart electric conductivity to the lithium-nickel-containing metal phosphate compound.

The material for carbon coating that is added in the above-described manner is not limited particularly, and a powdered carbon material is preferably used, or an organic compound material such as an organic acid can be used, provided that this material is carbonized by calcination conducted at a temperature higher than that of pre-calcination. Various types of carbon black such as acetylene black, furnace black, and Ketjen black and also graphite can be advantageously used as the carbon material. The preferred examples of organic compound materials (organic acids) include organocarboxylic acids such as acetic acid, oxalic acid, glycolic acid, oleic acid, linoleic acid, arachidonic acid, phthalic acid, citric acid, itaconic acid, ascorbic acid, lactic acid, malic acid, tartaric acid, and gluconic acid, organosulfonic acids, organosulfinic acids, organic composite oxide, organic nitro compounds, and phenols can be used. Organic acid salts formed by adding alkali compounds to the above-listed organic acids may be also used. The aforementioned compounds may be used individually or in combinations of two or more thereof.

The amount of the material for carbon coating that is to be added is set to 10 parts by weight to 40 parts by weight (preferably 10 parts by weight to 30 parts by weight, for example, 10 parts by weight to 20 parts by weight) per 100 parts by weight of the aforementioned starting material mixture. The above-mentioned device for mixing (including stirring and grinding) is not particularly limited. Thus, the pre-calcined matter and the material for carbon coating can be advantageously mixed and the material for carbon coating can be uniformly applied to the surface of the pre-calcined matter by using a planetary mixer, a planetary stirring apparatus, a disperser, a ball mill, a kneader, or a mixer.

<Calcination>

After the material for carbon coating has been applied to at least a portion of the pre-calcined surface, calcination is performed by heating at a temperature higher than the pre-calcination temperature and at least part of the surface of the calcined product is covered with carbon. Where the pre-calcined matter with the material for carbon coating applied thereto is further heated at a higher temperature, crystal growth is further enhanced, and the olivine-type crystal structure of the lithium-nickel-containing metal phosphate compound is formed at a composition ratio of a stoichiometric composition or a composition ratio close thereto. When an organic compound material such as an organic acid is used as the material for carbon coating, the organic compound material is carbonized by heating and a carbon coating film can be formed on (fused to) at least part of the surface of the lithium-nickel-containing metal phosphate compound. As a result, a positive electrode active material with excellent electric conductivity can be manufactured.

The calcination is performed by heating in a temperature range higher than the pre-calcination temperature. The typical range is from a temperature above 500° C. to a temperature equal to or lower than 900° C., preferably 500° C. to 800° C., more preferably 550° C. to 700° C., and even more preferably 600° C. to about 650° C. Typically, the calcination is performed by heating in a temperature range that is higher than the temperature of pre-calcination by at least 50° C., preferably at least 100° C., and even more preferably at least 200° C. As a result, the density of the olivine-type crystal structure of the lithium-nickel-containing metal phosphate compound can be advantageously increased. The calcination atmosphere is not particularly limited. For example, the calcination may be performed in the air atmosphere, or under an inactive gas atmosphere such as nitrogen gas, as necessary.

The lithium-nickel-containing metal phosphate compound obtained by the manufacturing method according to the present embodiment and having the surface thereof covered with carbon has excellent conductivity and high crystallinity. Therefore such compound can be advantageously used as a constituent element (positive electrode active material) of a positive electrode incorporated in lithium secondary batteries of various forms (typically lithium ion batteries).

After the calcination, if necessary, the lithium-nickel-containing metal phosphate compound is preferably ground. By grinding, granulating, and classifying the calcined matter with an appropriate means, it is possible to obtain a powder of granular lithium-nickel-containing metal phosphate compound that has the desired average particle size and/or particle size distribution.

The embodiments of the positive electrode using the lithium-nickel-containing metal phosphate compound obtained by the manufacturing method disclosed herein as a positive electrode active material and a lithium secondary battery using such positive electrode will be described below with reference to schematic diagrams presented in FIG. 3 and FIG. 4, but the present invention is not intended to be limited to these embodiments.

Figure 3:
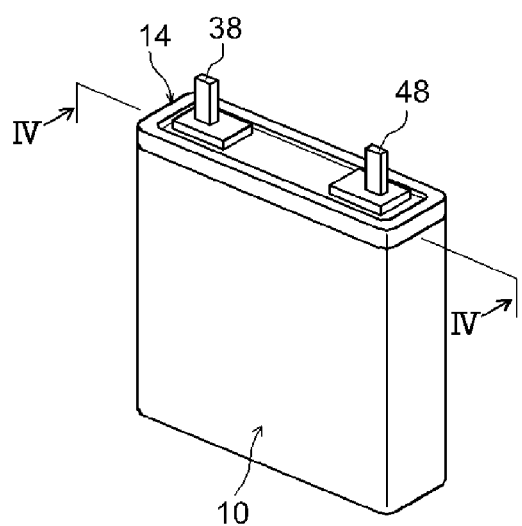
FIG. 3 illustrates schematically a lithium secondary battery according to an embodiment.

FIG. 3 is a perspective view illustrating schematically a lithium secondary battery of an angular shape according to one embodiment. FIG. 4 is a cross-sectional view taken along the IV-IV line in FIG. 3. As shown in FIG. 3 and FIG. 4, a lithium secondary battery 100 according to the present embodiment is provided with an angular battery case 10 in the form of a rectangular parallelepiped and a lid 14 that closes an opening 12 of the case 10. A flat electrode assembly (wound electrode assembly 20) and an electrolyte can be accommodated inside the battery case 10 through the opening 12. A positive electrode terminal 38 and a negative electrode terminal 48 for external connection are provided at the lid 14, and parts of these terminals 38, 48 protrude to the surface side of the lid 14. Parts of the external terminals 38, 48 are connected to an internal positive electrode terminal 37 or an internal negative electrode terminal 47 inside the case.

Figure 4:
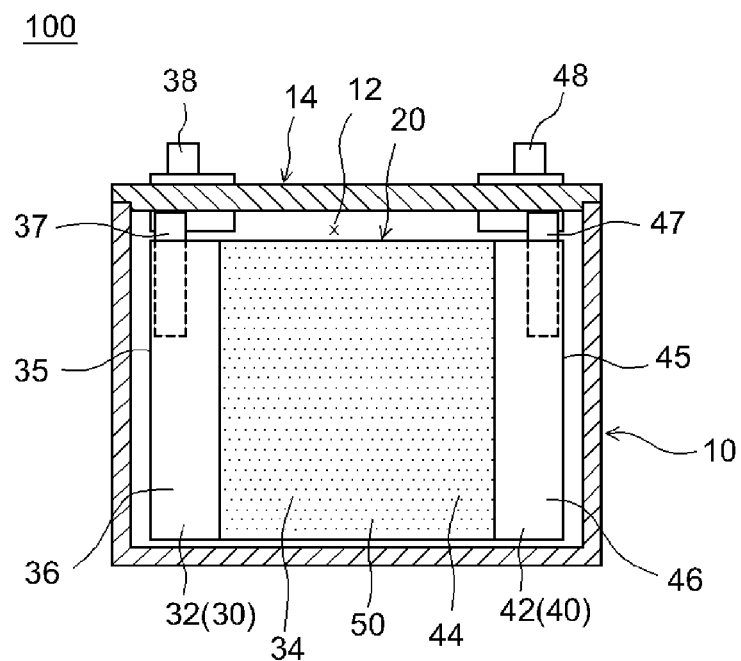
FIG. 4 is a cross-sectional view taken along the IV-IV line in FIG. 3.

As shown in FIG. 4, in the present embodiment, the wound electrode assembly 20 is accommodated inside the case 10. The electrode assembly 20 is constituted by a positive electrode sheet 30 in which a positive electrode active material layer 34 is formed on the surface of a long sheet-like positive electrode collector 32, a negative electrode sheet 40 in which a negative electrode active material layer 44 is formed on the surface of a long-sheet-like negative electrode collector 42, and a long sheet-like separator 50. The positive electrode sheet 30 and the negative electrode sheet 40 are laminated with two separators 50, the laminate is wound, and the obtained wound electrode assembly 20 is collapsed in the side surface direction to form a flat shape.

The positive electrode active material layer 34 is not formed on one end portion 35 along the longitudinal direction of the wound positive electrode sheet 30 and a portion where the positive electrode collector 32 is exposed (portion 36 where the positive electrode active material layer has not been formed) is thus provided. The negative electrode active material layer 44 is not formed on one end portion 46 along the longitudinal direction of the wound negative electrode sheet 40 and a portion where the negative electrode collector 42 is exposed (portion 46 where the negative electrode active material layer has not been formed) is thus provided. The inner positive electrode terminal 37 is joined to the portion 36 where the positive electrode active material layer has not been formed of the positive electrode collector 32, the inner negative electrode terminal 47 is joined to the exposed portion of the negative electrode collector 42, and the two are electrically connected to the positive electrode sheet 30 or negative electrode sheet 40 of the wound electrode assembly 20 formed to have a flat shape. The positive and negative electrode terminals 37, 47 and the positive and negative electrode collectors 32, 42 can be joined, for example, by ultrasound welding or resistance welding.

The positive electrode sheet 30 is provided with a configuration in which the positive electrode active material layer 34 including the positive electrode active material is formed on the elongated positive electrode collector 32. An aluminum foil or other metal foil suitable for the positive electrode can be advantageously used for the positive electrode collector 32. The positive electrode active material can use the lithium-nickel-containing metal phosphate compound obtained by using the manufacturing method disclosed herein.

In addition to the positive electrode active material, a binder and a conductive material of one or more kinds that can be compounded with a typical lithium secondary battery can be introduced, as necessary, into the positive electrode active material layer 34. A conductive powdered material such as a carbon powder or carbon fibers is preferably used as the conductive material. For example, acetylene black, furnace black, Ketjen black, and graphite powder are preferred, and these powders may be used individually or in combinations of two or more thereof.

The positive electrode active material layer 34 can be advantageously fabricated by adding the positive electrode active material, binder, and conductive material to an appropriate solvent (water, organic solvent, or mixed solvents thereof), dispersing or dissolving to obtain a paste- or slurry-like composition, coating the composition on the positive electrode collector 32, drying out the solvent and compressing.

The negative electrode (typically the negative electrode sheet 40) can have a configuration in which the negative electrode active material layer 44 is formed on the elongated negative electrode collector 42 (for example, a copper foil). One or more substances that have been conventionally used in lithium secondary batteries can be used without any particular limitation for the negative electrode active material. The preferred among them are carbon particles. A particulate carbon material (carbon particles) including a graphite structure (layered structure) can be advantageously used as at least part of the material. Carbon materials having a structure of the so-called graphite-like materials (graphite), hardly graphitizable carbonaceous materials (hard carbon), easily graphitizable carbonaceous materials (soft carbon), and combinations thereof can be also used advantageously.

In addition to the negative electrode active material, materials, such as a binder, of one or more kinds that can be compounded with a typical lithium secondary battery can be introduced, as necessary, into the negative electrode active material layer 44. The negative electrode active material layer can be advantageously fabricated by adding the negative electrode active material and binder to an appropriate solvent (water, organic solvent, or mixed solvents thereof), dispersing or dissolving to obtain a paste- or slurry-like composition, coating the composition on the negative electrode collector 42, drying out the solvent and compressing.

The preferred separator sheet 50 that is used between the positive and negative electrode sheets 30, 40 can be formed of a porous polyolefin resin. For example, a porous separator sheet made from a synthetic resin (for example, a polyolefin such as polyethylene) can be advantageously used. When a solid electrolyte or gelled electrolyte is used as the electrolyte the separator is sometimes not required (that is, in such a case, the electrolyte itself can function as a separator).

An electrolyte similar to the nonaqueous electrolytic solution that has been used in the conventional lithium secondary batteries can be used, without any particular limitation, as the electrolyte. The aforementioned nonaqueous electrolytic solution typically has a composition including a support salt in an appropriate nonaqueous solvent. One or more compounds selected from the group consisting of propylene carbonate (PC), ethylene carbonate (EC), diethyl carbonate (DEC), dimethyl carbonate (DMC), and ethylmethyl carbonate (EMC) can be used as the non-aqueous solvent. Examples of suitable support salts include lithium compounds (lithium salts) such as $LiPF_6$, $LiBF_4$, $LiClO_4$, and $LiAsF_6$.

A general procedure of constructing the lithium secondary battery 100 according to one embodiment will be explained below. The above-mentioned fabricated positive electrode sheet 30 and negative electrode sheet 40 are laminated together with two separators 50 and the laminate is wound. The electrode assembly 20 thus obtained is molded into a flat shape by pressing and expanding in the lamination direction. The molded electrode assembly is accommodated in the battery case 10, the electrolyte is poured into the battery case 10, and the lid 14 is mounted on the case opening 12, and sealed, thereby producing the lithium secondary battery 100 of the present embodiment. The structure, dimensions, and material (for example, the case can be made from a metal or a laminated film) of the battery case 10 are not particularly limited.

The lithium secondary battery constructed in the above-described manner is thus constructed by using the positive electrode active material formed of the lithium-nickel-containing metal phosphate compound of the olivine-type crystal structure that has carbon applied thereto and has high crystallinity as described hereinabove. Therefore, the lithium secondary battery has a high energy density and excellent battery characteristics (for example, high rate characteristic and cyclic characteristic).

Test examples (production examples) relating to the present invention are described below, but the present invention is not intended to be limited to these specific examples.

The crystal structure of the lithium-nickel-containing metal phosphate compound manufactured by the manufacturing method disclosed herein has been analyzed by X-ray diffraction analysis

EXAMPLE 1

Synthesis of lithium-nickel-containing Metal Phosphate Compound

Among the lithium-nickel-containing metal phosphate compounds represented by general formula (1) $LiNi_{(1-x)}M_xPO_4$, in Example 1, Mn was taken as the M element and $LiNi_{0.8}Mn_{0.2}PO_4$ in which the M element content ratio x was 0.2 was synthesized.

Thus, lithium acetate dihydrate [$Li(CH_3COO) \cdot 2H_2O$], nickel (II) acetate tetrahydrate [$Ni(CH_3COO)_2 \cdot 4H_2O$], manganese (II) acetate tetrahydrate [$Mn(CH_3COO)_2 \cdot 4H_2O$], and ammonium dihydrogen phosphate ($NH_4H_2PO_4$) were used as the starting materials and weighed to obtain mixing ratios ensuring the aforementioned composition ratios. The weighed starting materials were mixed with the aqueous solvent and heated at 80° C. to prepare a gelled starting material mixture. The starting material mixture was heated and pre-calcined at 350° C. A carbon powder was added to the pre-calcined matter obtained by the heating and the components were mixed in a ball mill. Then, calcination was conducted by heating at 600° C. and $LiNi_{0.8}Mn_{0.2}PO_4$ according to Example 1 was obtained.

EXAMPLE 2

Synthesis of lithium-nickel-containing Metal Phosphate Compound

Among the lithium-nickel-containing metal phosphate compounds represented by Formula (1), in Example 2, Mn was taken as the M element and $LiNi_{0.9}Mn_{0.1}PO_4$ in which the M element content ratio x was 0.1 was synthesized.

$LiNi_{0.9}Mn_{0.1}PO_4$ was synthesized in the same manner as in Example 1, except that the composition ratio was changed.

EXAMPLE 3

Synthesis of lithium-nickel-containing Metal Phosphate Compound

Among the lithium-nickel-containing metal phosphate compounds represented by Formula (1), in Example 3, Mg was taken as the M element and $LiNi_{0.8}Mg_{0.2}PO_4$ in which the M element content ratio x was 0.2 was synthesized.

Thus, $LiNi_{0.8}Mg_{0.2}PO_4$ was synthesized in the same manner as in Example 1, except that magnesium (II) acetate tetrahydrate $[Mg(CH_3COO)_2.4H_2O]$ was used instead of manganese (II) acetate tetrahydrate $[Mn(CH_3COO)_2.4H_2O]$.

COMPARATIVE EXAMPLE 1

Synthesis of lithium-nickel-containing Metal Phosphate Compound

Among the lithium-nickel-containing metal phosphate compounds represented by Formula (1), in Comparative Example 1, $LiNiPO_4$ containing no M element present in Formula (1) was synthesized.

Thus, $LiNiPO_4$ was synthesized in the same manner as in Example 1, except that manganese (II) acetate tetrahydrate $[Mn(CH_3COO)_2.4H_2O]$ was removed from the starting materials.

COMPARATIVE EXAMPLE 2

Synthesis of lithium-nickel-containing Metal Phosphate Compound

In Comparative Example 2, lithium-manganese-containing metal phosphate compound represented by $LiMnPO_4$ was synthesized.

Thus, $LiMnPO_4$ was synthesized in the same manner as in Comparative Example 1, except that manganese (II) acetate tetrahydrate $[Mn(CH_3COO)_2.4H_2O]$ was used instead of nickel (II) acetate tetrahydrate $[Ni(CH_3COO)_2.4H_2O]$.

[XRD Analysis]

Figure 5:
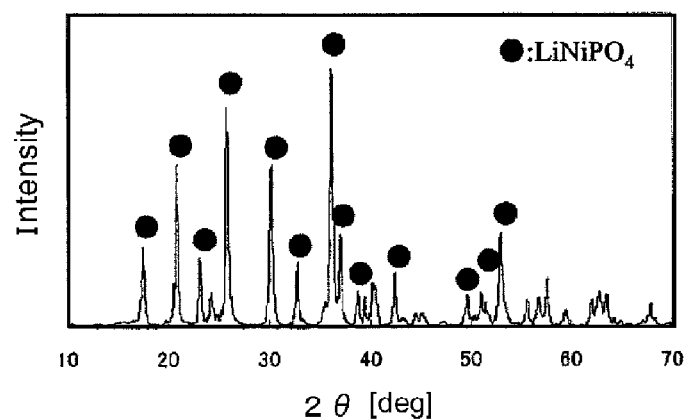
FIG. 5 illustrates an X-ray diffraction pattern of $LiNi_{0.8}Mn_{0.2}PO_4$.
Figure 6:
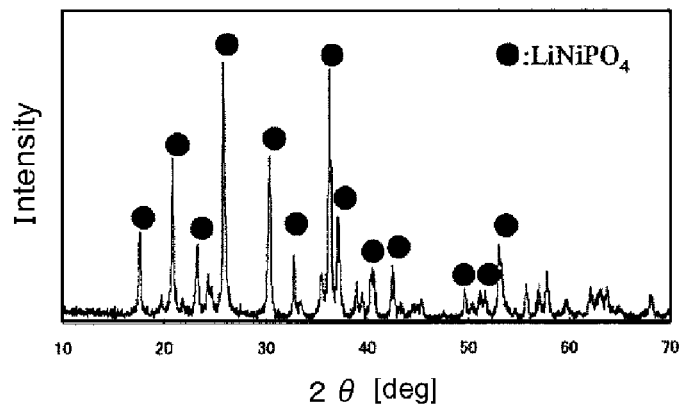
FIG. 6 illustrates an X-ray diffraction pattern of $LiNi_{0.9}Mn_{0.1}PO_4$.
Figure 7:
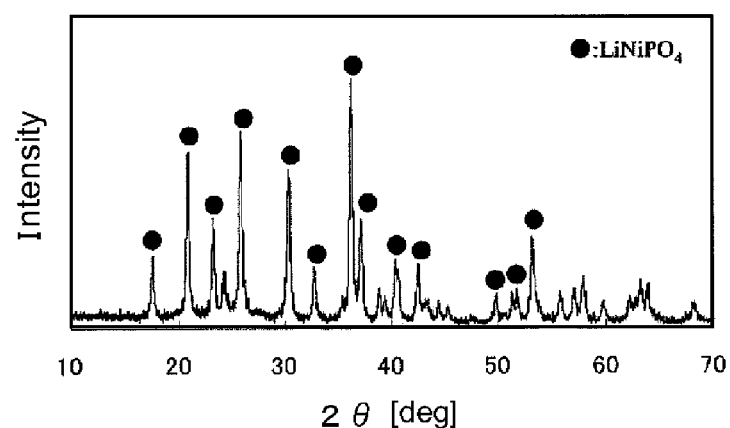
FIG. 7 illustrates an X-ray diffraction pattern of $LiNi_{0.8}Mg_{0.2}PO_4$.
Figure 8:
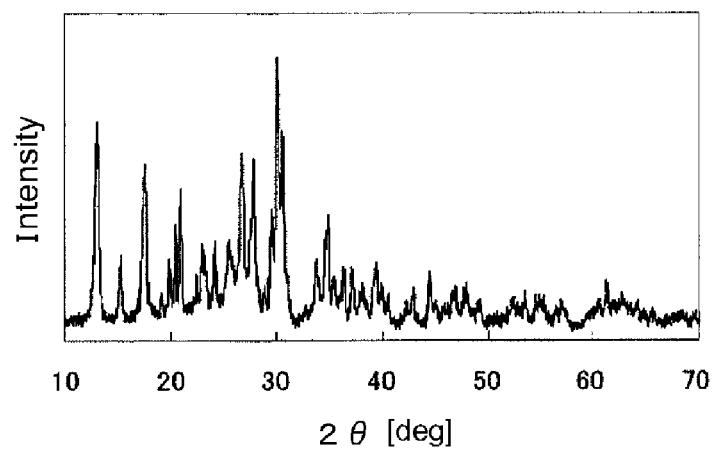
FIG. 8 illustrates an X-ray diffraction pattern of $LiNiPO_4$.
Figure 9:
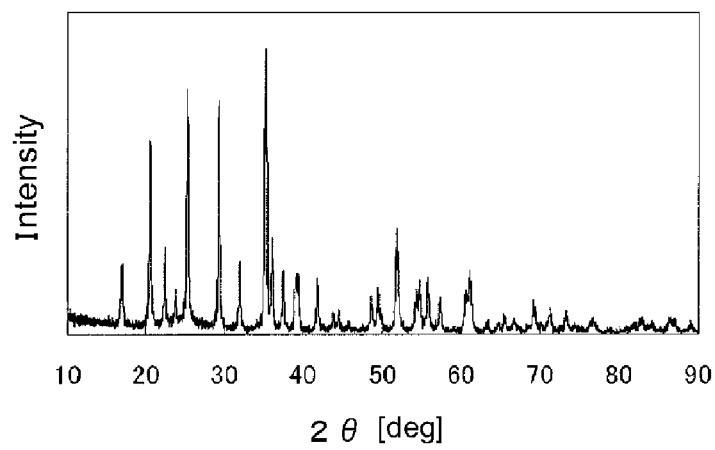
FIG. 9 illustrates an X-ray diffraction pattern of $LiMnPO_4$.

The crystal structure of phosphate compounds synthesized in the above-described examples and comparative examples was analyzed with a powder X-ray diffraction analyzer (XRD). The respective X-ray diffraction patterns are shown in FIGS. 5 to 9. FIG. 5 shows the X-ray diffraction pattern of $LiNi_{0.8}Mn_{0.2}PO_4$ (Example 1). FIG. 6 shows the X-ray diffraction pattern of $LiNi_{0.9}Mn_{0.1}PO_4$ (Example 2). FIG. 7 shows the X-ray diffraction pattern of $LiNi_{0.8}Mg_{0.2}PO_4$ (Example 3). FIG. 8 shows the X-ray diffraction pattern of $LiNiPO_4$ (Comparative Example 1). FIG. 9 shows the X-ray diffraction pattern of $LiMnPO_4$ (Comparative Example 2).

According to the X-ray diffraction patterns shown in FIGS. 5 to 7, the crystal structure of the lithium-nickel-containing metal phosphate compounds obtained in Examples 1 to 3 demonstrated a strong peak belonging to a lithium-nickel-containing metal phosphate compound with the olivine-type crystal structure at a 2θ value close to 27° or 37°. By contrast, according to the X-ray diffraction patterns shown in FIG. 8, the lithium-nickel-containing metal phosphate compound obtained in Comparative Example 1 demonstrated no peak at a position close to a 2θ value of 27° or 37° and the crystal structure as a whole was confirmed to have collapsed. The X-ray diffraction pattern shown in FIG. 9 confirmed that the olivine-type crystal structure of the lithium-manganese-containing metal phosphate compound obtained in Comparative Example 2 has not collapsed.

The results presented above demonstrate that in a phosphate compound including Mn or Mg as the M element, from among the lithium-nickel-containing metal phosphate compounds represented by general formula (1) $LiNi_{(1-x)}M_xPO_4$, the crystal structure has not collapsed in the production process and the surface of crystals could be covered with carbon. Further, since the olivine-type crystal structure of the lithium-manganese-containing metal phosphate compound according to Comparative Example 2 that has been synthesized by a similar method has not collapsed, it is clear that the decrease in crystallinity caused by the application of a material for carbon coating (carbon material or the like) in the manufacturing process is a problem inherent to lithium-nickel-containing metal phosphate compounds.

The present invention is explained in detail hereinabove, but these are merely the embodiments and examples of the invention, and the invention disclosed herein includes various modifications and changes of the above-described specific examples. For example, batteries with a variety of contents that differ in electrode constituent materials and electrolytes may be used. Further, the size of the battery and other features can be changed as appropriate according to the application (typically, installation on a vehicle).

Industrial Applicability

Figure 10:
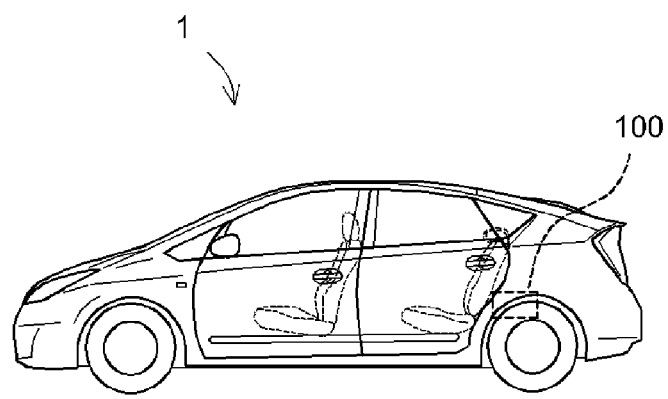
FIG. 10 is a side view illustrating schematically a vehicle (automobile) provided with a lithium secondary battery according to an embodiment.

As described hereinabove, a lithium secondary battery constructed by using a lithium-nickel-containing metal phosphate compound obtained by the method in accordance with the present invention as a positive electrode active material has a high energy density and therefore can be advantageously used in particular as a power supply for a motor (electric motor) to be installed on a vehicle such as an automobile. Therefore, the present invention provides the vehicle 1 (typically, an automobile, in particular an automobile provided with an electric motor, such as a hybrid automobile, an electric automobile, and a fuel cell automobile) including as a power supply the lithium secondary battery (typically a battery set in which a plurality of battery units are connected in series) 100, as shown schematically in FIG. 10.

EXPLANATION OF REFERENCE NUMERALS 1 vehicle
10 battery case
12 opening
14 lid
20 wound electrode assembly 30 positive electrode sheet
32 positive electrode collector
34 positive electrode active material layer
38 outer positive electrode terminal
40 negative electrode sheet
42 negative electrode collector
44 negative electrode active material layer
48 outer negative electrode terminal
50 separator
100 lithium secondary battery

The invention claimed is:

1. A positive electrode active material formed of a lithium-nickel-containing metal phosphate compound represented by a general formula:

$$LiNi_{(1-x)}M_xPO_4 \quad (1)$$

(in Formula (1), M is Mg, and x is a number satisfying the condition 0<x<0.5), wherein
at least part of a surface of the lithium-nickel-containing metal phosphate compound is covered with carbon, and
the lithium-nickel-containing metal phosphate compound covered with carbon has an olivine-type crystal structure with a maximum peak at a position close to a 2θ value of 27° or 37°, as confirmed by structure analysis by X-ray diffraction.

2. The positive electrode active material according to claim 1, wherein x in the Formula (1) is a number satisfying the condition 0<x0.2.

* * * * *